(12) United States Patent
Carroll

(10) Patent No.: US 8,118,435 B2
(45) Date of Patent: Feb. 21, 2012

(54) MULTIPLE PROJECTOR IMAGE OVERLAY SYSTEMS

(76) Inventor: David W. Carroll, Grantsburg, WI (US)

( * ) Notice: Subject to any disclaimer, the term of this patent is extended or adjusted under 35 U.S.C. 154(b) by 335 days.

(21) Appl. No.: 12/400,684

(22) Filed: Mar. 9, 2009

(65) Prior Publication Data

US 2009/0257031 A1  Oct. 15, 2009

Related U.S. Application Data

(60) Provisional application No. 61/034,823, filed on Mar. 7, 2008.

(51) Int. Cl.
*G03B 21/14* (2006.01)

(52) U.S. Cl. .......................................... 353/94; 353/30

(58) Field of Classification Search ............. 353/30, 353/94, 39, 69, 70, 101; 348/746, 806
See application file for complete search history.

(56) References Cited

U.S. PATENT DOCUMENTS

| | | | |
|---|---|---|---|
| 5,077,154 A * | 12/1991 | Corley | 430/4 |
| 6,984,043 B2 * | 1/2006 | Nakamura et al. | 353/94 |
| 7,364,309 B2 * | 4/2008 | Sugawara et al. | 353/85 |
| 7,686,457 B2 * | 3/2010 | Kobayashi et al. | 353/94 |
| 2006/0072075 A1 * | 4/2006 | De Vaan | 353/30 |
| 2008/0266321 A1 * | 10/2008 | Aufranc et al. | 345/626 |
| 2008/0309884 A1 * | 12/2008 | O'Dor et al. | 353/7 |
| 2009/0033874 A1 * | 2/2009 | Aufranc et al. | 353/30 |

* cited by examiner

*Primary Examiner* — William C Dowling
(74) *Attorney, Agent, or Firm* — Dicke, Billig & Czaja, PLLC

(57) ABSTRACT

A display system for providing enhanced brightness projected images from a micro-projector. The system includes at least two micro-projector display devices, one or more sensors, and a controller. The sensors provide information to the controller indicative of the micro-projector display devices having been placed in proximity to each other to project identical images, the controller further being programmed to determine from information generated by the sensors their alignment and maximize cooperative pixel alignment between multiple images generated by the micro-projector display devices by offsetting a center of an image in one or more of the projector devices.

18 Claims, 4 Drawing Sheets

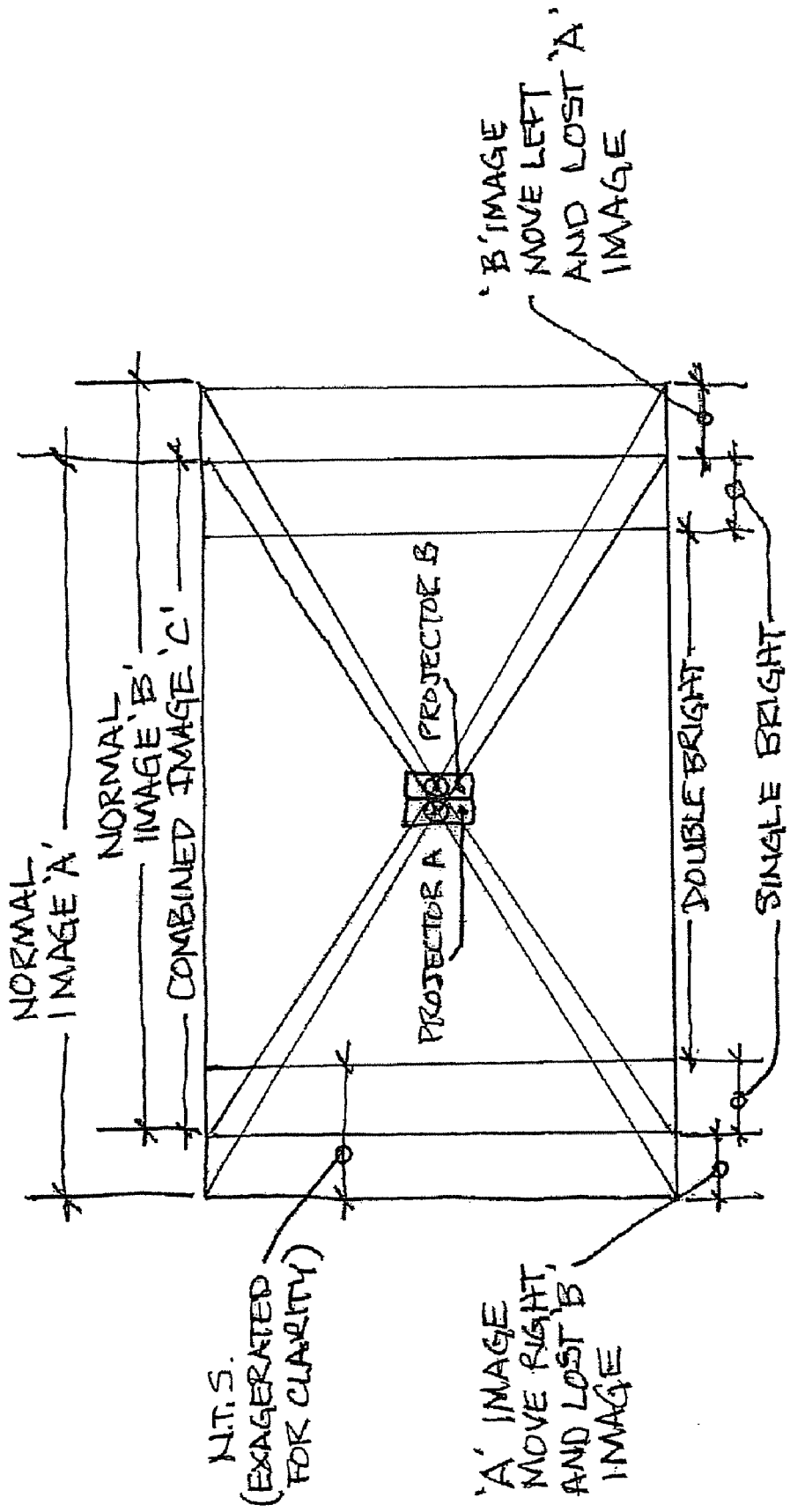

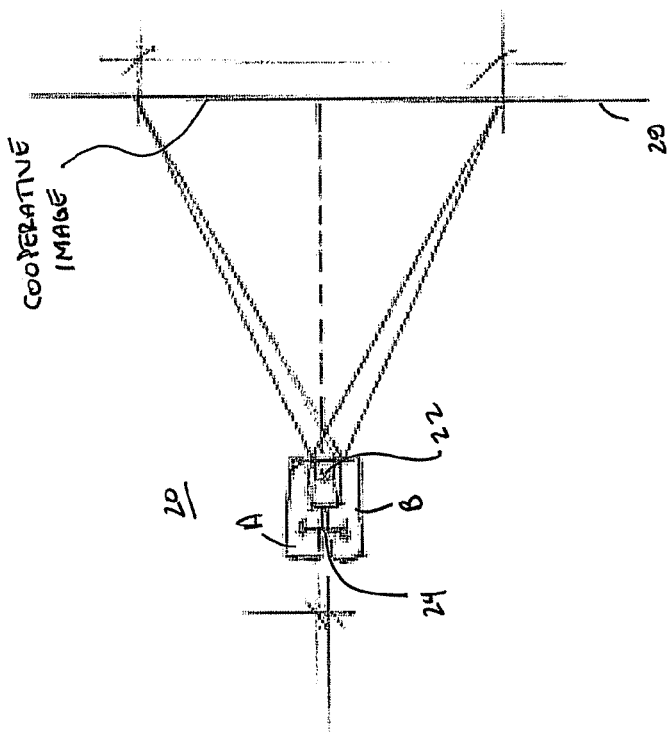
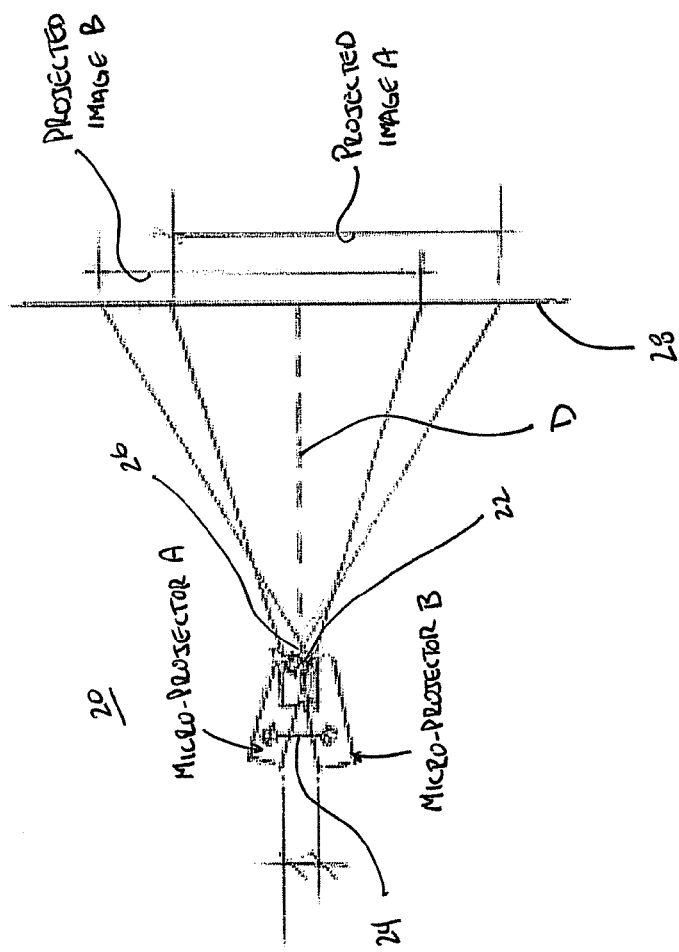

MULTIPLE PROJECTOR IMAGE OVERLAY SYSTEMS

CROSS-REFERENCE TO RELATED APPLICATIONS

This application claims priority under 35 U.S.C. §119(e)(1) to U.S. Provisional Patent Application Ser. No. 61/034,823, filed Mar. 7, 2008, entitled "Multiple Projector Image Overlay Systems"; the entire teachings of which are incorporated herein by reference.

BACKGROUND

Miniature image projection engine design and performance advancements have been substantial in recent times. Technical achievements in electro-optical effects using electroluminescence (EL), organic light emitting diode (OLED), polymer organic light emitting diode over (P-OLED/CMOS), OLED on silicon and tilted mirrors (DLP) reflective, liquid crystal on silicon (LCOS), laser light with MEMS (MicroVision's PicoP) are systems demonstrating continued progress. A few of these engines are just coming to market in the form of products. Products for mobile use are forecast to be a growing market. As image brightness improves user satisfaction and ambient light conditions required for use will both broaden.

Brightness is a current problem with these mini-projectors. Their ability to be brighter is largely limited by the fundamental component capacity of these designs. However, these highly mobile and/or easily relocated products are thought to become pervasive because users want to share images and have larger displays without the issues surrounding bulkier and heavier current product and display options. Therefore, a need exists for systems and related methods of operation that promote improved brightness displays with mini-projectors.

SUMMARY

Aspects of the present disclosure relate to display systems incorporating two or more micro-projectors (or micro-display projector engines). The display systems of the present disclosure provide solutions for the brightness shortcoming associated with prior micro-projectors by talking advantage of the small engine size and/or the pervasiveness of the devices. The methods and systems of the present disclosure make use of multiple mobile display engines in concert or overlay to create brighter images.

Some examples of optional features associated with systems of the present disclosure that improve the form factor's brightness of prior designs include:

Systems that use two or more micro-display projector engines in a fixed fashion to overlay images by offsetting the projected image on one or both sensors to provide a multiple brightness for a large majority of the resultant or cooperative image.

Systems that use two or more micro-display projector engines hinged at one edge and automatically adjusted to align to the display surface based on servo driven angles at the opposite edge as directed by distance sensors and an algorithm driven application.

Systems that use secondary device(s) proximity sensors to establish a potential partnering display, wireless image sharing and image sensing and automated cooperative alignment servo driven system or validation lighting when manually overlay images are achieved according to image or device location sensors.

BRIEF DESCRIPTION OF THE DRAWINGS

FIG. 2 is a simplified front schematical illustration of the display system of FIG. 1, including a combined image projected thereby;

FIG. 3A is a simplified side view of another display system in accordance with principles of the present disclosure in an unadjusted state and including a representation of images projected thereby;

FIG. 3B is a simplified side view of the system of FIG. 3A in an adjusted state and including a representation of a combined image projected thereby;

DETAILED DESCRIPTION

Figure 1:
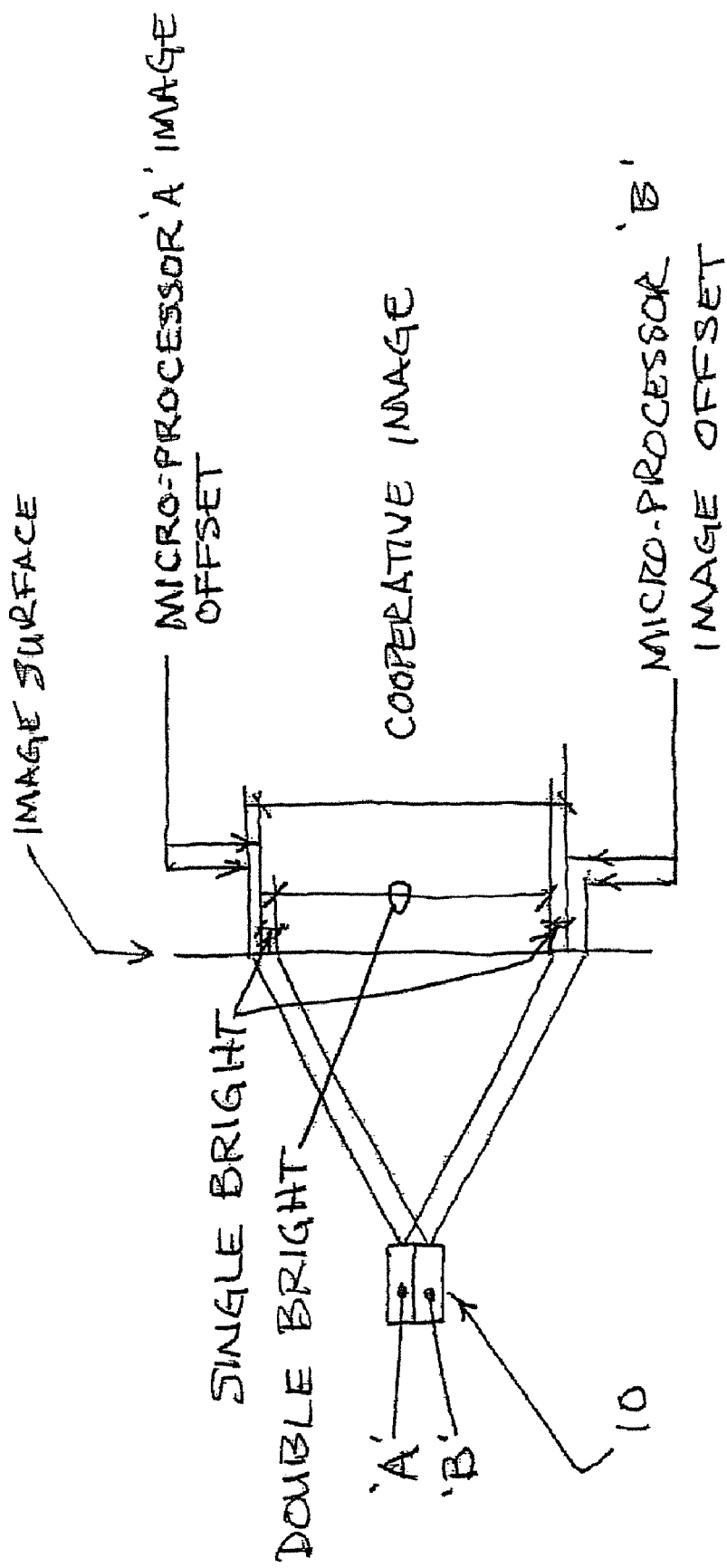
FIG. 1 is a simplified side schematical illustration of a display system in accordance with principles of the present disclosure.

Aspects of the present invention relate to a display system in which two or more micro-projectors are commonly operated to generate a resultant image (or cooperative image or combination image) of enhanced brightness. One embodiment of a system 10 in accordance with the present disclosure is shown in FIG. 1. The system 10 includes first and second micro-projectors A, B affixed to one another, and commonly operated via a micro-processor (not shown) to generate a resultant, cooperative image ("cooperative image" in FIG. 1) on a surface. While two of the micro-projectors A, B are shown, in other embodiments, the system 10 can include three or more micro-projectors. Regardless, the micro-projectors A, B are operated to generate an identical image, with the microprocessor compensating for an offset between the image generated by the first micro-projector A ("micro-projector A image offset" in FIG. 1) and the image generated by the second micro-projector B ("micro-projector B image offset" in FIG. 1). With this technique, the cooperative image will include a central, primary region of enhanced brightness ("double bright" in FIG. 1), whereas minor, outlying regions of the cooperative image will have a nominal brightness ("single bright" in FIG. 1).

The enhanced brightness of the cooperative or combined image is further shown in FIG. 2. In particular, FIG. 2 illustrates the combined image C generated by operation of the first and second micro-projectors A, B. The normal image generated by the first micro-projector A ("normal image A" in FIG. 2) overlays the normal image generated by the second micro-projector B ("normal image B" in FIG. 2), and vice-versa. The processor (not shown) compensates for regions of the normal images A, B that are not otherwise directly overlaid with one another, for example by moving the image from the first projector A to the right, and moving the image from the second micro-projector B to the left in some embodiments. Regardless, a vast majority of the combined image C has an enhanced brightness ("double bright" in FIG. 2), whereas a minor peripheral region of the combined image C is of less brightness ("single bright" in FIG. 2).

Another embodiment display system 20 in accordance with principles of the present disclosure is shown in FIGS. 3A and 3B. In general terms, the system 20 includes first and second micro-projectors A, B movably connected to one another at a hinge point 22. A microprocessor (not shown)

controls operation of the micro-projectors A, B in displaying images, as well as a servo-motor (not shown) that effectuates relative movement of the micro-projectors A, B relative to one another via a linkage 24 established between the micro-projectors A, B generally opposite the hinge point 22. With this construction, the microprocessor operates to optimally position the micro-projectors A, B relative to one another in achieving an optimized, cooperative image as described above. In particular, each of the micro-projectors A, B projects an image (labeled in FIG. 3A as "Projected Image A" for the image projected by the first micro-projector A, and "Projected Image B" for the image projected by the second micro-projector B) on to a surface 28. Based on information generated by one or more sensors (not shown but referenced generally at 26 in FIG. 3A as sensing a sensor distance D) associated with the system 20, the microprocessor operates the servo-motor to adjust the relative positioning of the micro-projectors A, B via movement of the linkage 24. As a result, the microprocessor automatically maneuvers the micro-projectors A, B relative to one another from the position of FIG. 3A (unadjusted spacing) to the position of FIG. 3B (adjusted spacing) in optimizing the resultant, cooperative image on the surface 28 (labeled as "Cooperative Image" in FIG. 3B). In this manner, then, the cooperative image has enhanced brightness over a vast majority of the display.

Figure 4B:
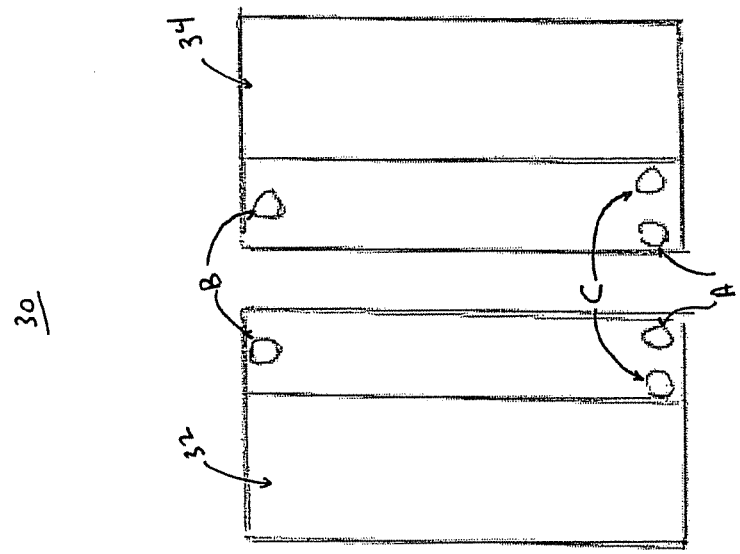
FIG. 4B is another view of the display system of FIG. 4A.
Figure 4A:
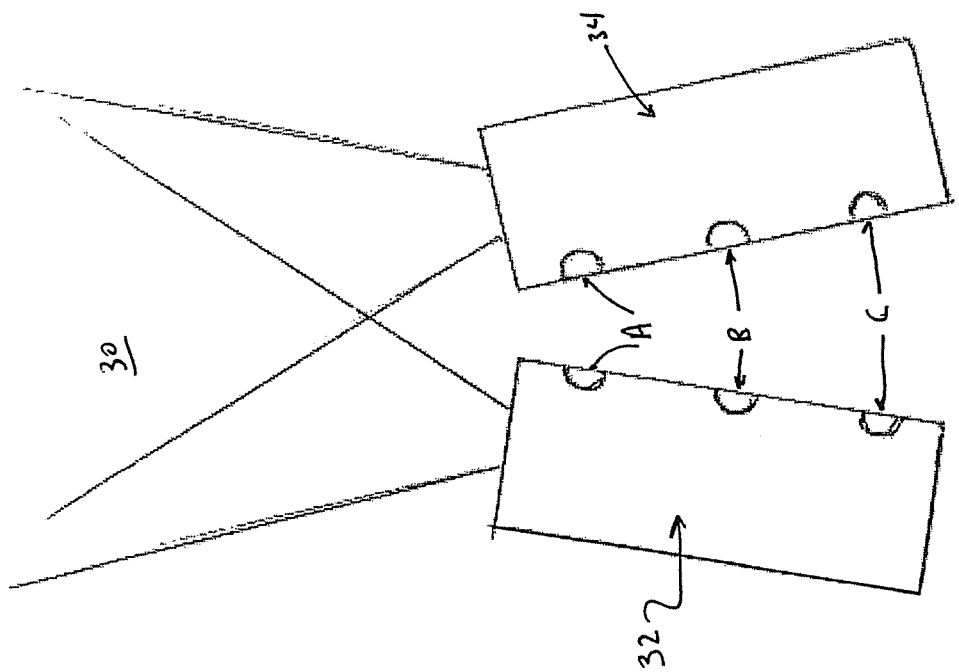
FIG. 4A is a simplified plan view of another display system in accordance with principles of the present disclosure.

Yet another embodiment display system 30 in accordance with aspects of the present disclosure is shown in FIGS. 4A and 4B. The display system 30 includes at least two micro-projector devices 32, 34 each incorporating one or more sensors A-C. Further, a microprocessor (not shown), either separately provided or carried by one or both of the micro-projectors 32, 34, operates to indicate an optimal positioning of the micro-projectors 32, 34 relative to one another in optimizing brightness of the resultant, combined or cooperative image generated by overlaying the images produced by the micro-projectors 32, 34 as described above. In this regard, spatial relationships between the micro-projectors 32, 34 can be based upon information generated between corresponding pairs of the sensors A, B, C. Thus, the sensors A, B, C can serve as triangulated distance sensors for determining relative positioning of the micro-projectors 32, 34. Fine tuning/adjustment can be accomplished using separate software to achieve desired double-brightness that adjusts images to optimal overlap.

One simple version of a display system in accordance with the present disclosure capable of achieving double brightness (as compared to prior devices) for about 97% of the resultant image is exampled as follows: 3M LCOS mini-projector image is 10 lumens. To get double that brightness or 20 lumens for approximately 90% to 97% of a 25" to 50" image and 10 lumens for the remaining image, two (or more) of the mini-projectors are provided and associated with one another as described above (i.e., either assembled to one another, or simply loosely spatially associated with one another). The so-paired projectors can be driven by a single micro-controller with appropriate electronics and design. This dual unit would have rewritten code for each projector. The image from each micro-projector would be preset to still show the 640× 480 image but do so in a shifted fashion. The image would be dropped off on the left and blacked out on the right micro-projector and in reverse for the left micro-projector. This avoids parallax image misalignment. With this approach, the manufacturer will always have a 'mostly' double bright solution for all future devices. Brighter in the case of projectors is better.

Optionally, a set of tested displays can verify image alignment affixed pairs. Adjustable images shifting can be made at that time and permanently set at the factory based on actual pixel alignment and cooperative proximity.

In the above fixed pair of 3M LCOS display engines example, the aspects of the present disclosure uniquely and purposefully 'misaligns' for overlap. Other manufacturing types and manufacturers could apply similar application of the features of the present disclosure. In the case of MicroVision, the two devices twin lasers could be offset without drop-off. The driver system would be doubled as required to provide dual imaging.

In other embodiments, the display systems of the present disclosure incorporate imaging and location sensors to provide two or more separate micro-projector devices to double the brightness of the resultant, cooperative image. In these applications (e.g., FIGS. 4A and 4B), one or both of the micro-projectors are configured to incorporate hardware or software that "recognizes" the presence of the other, compatible micro-projector via a matching and dual performance hardware and software system. The controller then uses sensors to monitor the position of the secondary or multiple micro-projector devices to set the distance and/or the angle best for the most uniform overlay between the devices. For example, if a first micro-projector unit is set on a table 40" from a wall and a second micro-projector unit would be moved close by and moved around until a message is projected to designate the alignment has been achieved. The light would know alignment has been achieved by one of a selected possible image or position validation methods. One method uses orientation sensors in each device to confirm alignment or device placement. A second validation method adapts a focus and servo system similar to that used in automatic projection focus system. A further method uses edge detection to determine if the two images are combining to be as small as possible, thereby verifying alignment.

In any case, the display systems of the present disclosure creates working means to provide multiple miniature projector overlay of identical images to multiple the brightness of the resultant image.

Although the present disclosure has been described with reference to preferred embodiments, workers skilled in the art will recognize that changes can be made in form and detail without departing from the spirit and scope of the present disclosure.

What is claimed is:

1. A display system comprising:
   first and second micro-projector display devices displaying first and second images, respectively, the micro-projector display devices placed in a fixed, parallel and aligned proximity to each other such that the first and second images combine to form a total combined image defining a vertical axis and a horizontal axis, wherein the first and second display devices are arranged such that the first and second images are fixed relative to one another along one of the vertical and horizontal axes, and at least the first image is moveable relative to the second image along an other of the vertical and horizontal axes; and
   a controller controlling operation of the display devices, including prompting at least one of the first and second display devices to project the corresponding image in an offset manner relative to only one of the vertical and horizontal axes to permit maximum pixel alignment between the two images in forming the total combined image.

2. The system of claim 1, wherein controller is programmed to drop off a portion of the first image from the total combined image.

3. The system of claim 1, wherein the total combined image projected area retains an original pixel ratio of a single one of the micro-projector display devices.

4. The system of claim 1, wherein the micro-projector display devices are driven by a single micro-processing system in a single case.

5. The system of claim 1, wherein the micro-projector display devices are powered by an alternating current.

6. A display system comprising two micro-projector display devices placed in parallel and aligned with each other with one edge of a first device being affixed with a hinge, and a position of an edge of each device opposite the hinge being automatically adjustable by a servo motor as directed by a microprocessor and software, said software using an algorithm to maximize pixel overlay in concert with the results of a distance sensor to the image surface.

7. A display system comprising at least two micro-projector display devices, one or more sensors, and a controller, wherein the sensors provide information to the controller indicative of the micro-projector display devices having been placed in proximity to each other to project identical images, the controller further being programmed to determine from information generated by the sensors their alignment and maximize cooperative pixel alignment between multiple images generated by the micro-projector display devices by offsetting a center of an image in one or more of the projector devices.

8. The system of claim 7, wherein a cooperatively projected image designates optimized alignment and overlay has been achieved.

9. The system of claim 7, wherein the micro-projector display devices display an image that assists the controller in optimizing an image cooperation positioning.

10. The system of claim 7 configured such that a user can instigate or terminate an automated overlaying of image process based on a sensed proximity.

11. The system of claim 7, wherein the system further includes a loudspeaker, wherein the controller is further programmed to generate audio instructions to a user to assist in positioning the micro-projector display devices relative to one another.

12. The system of claim 7, wherein controller is programmed to prompt arrangement of the at least two micro-projector devices in a manner offsetting images generated by the micro-projector devices relative to one other to overlay pixels by changing data projected to less than an full processed image and offset to a center of at least one of the micro-projector display devices.

13. The system of claim 12, wherein a combined projected area is created by a combination of images from each of the micro-projector display devices that is brighter than a brightness of an image projected by any one of the micro-projector display devices.

14. The system of claim 12, wherein an outer edge of an original individual projection from at least one of the micro-projector display devices is shown to help align multiple device images.

15. The system of claim 12, wherein offset images are continuously adjusted based on the sensor-derived knowledge of motion of the devices.

16. The system of claim 7, wherein the controller is programmed to operate the at least two micro-projector devices to adjust an image or images to overlay pixels to show the same image over the same display area using device position sensors.

17. The system of claim 7, wherein the controller prompts the at least two micro-projector devices to adjust a corresponding image or images to overlay pixels to show the same image over the same display area using combined image size and/or edge detection sensing.

18. The system of claim 7, wherein the system is configured such that unacceptable parallax distortion defaults from combined images to a single displayed image from one device.

* * * * *